United States Patent [19]

Weber et al.

[11] 4,370,202

[45] Jan. 25, 1983

[54] METHOD FOR DRY COOLING COKE AND COKE COOLER TO IMPLEMENT THE METHOD

[76] Inventors: Heinrich Weber, Lenaustr. 2, 4350 Recklinghausen; Kurt Lorenz, Habichstr. 65, 4321 Hattingen; Horst Dungs, Am Düngelbruch 21, 4690 Herne, all of Fed. Rep. of Germany

[21] Appl. No.: 208,316

[22] Filed: Nov. 19, 1980

[30] Foreign Application Priority Data

Dec. 22, 1979 [DE] Fed. Rep. of Germany ....... 2952065

[51] Int. Cl.³ .............................................. C10B 39/00
[52] U.S. Cl. ...................................... 202/228; 201/39
[58] Field of Search .......................... 201/39, 228, 227

[56] References Cited

U.S. PATENT DOCUMENTS

| | | | |
|---|---|---|---|
| 1,836,605 | 12/1931 | Moetteli | 202/228 |
| 1,849,158 | 3/1932 | Schwartz | 202/228 |
| 3,895,448 | 7/1975 | Jonnet | 202/228 |
| 4,106,998 | 8/1978 | Okada et al. | 202/228 |

Primary Examiner—Norman Yudkoff

[57] ABSTRACT

A coke cooler and method of operating the cooler is disclosed for dry cooling hot glowing coke through the recovery of the sensible heat of the hot glowing coke. The apparatus includes a vertically elongated vessel having walls partially formed with integral heat exchange tubes for the passage of a liquid coolant and a shroud having an internal prechamber mounted in the upper end of the vessel for receiving a charge of the hot glowing coke. The shroud cooperates with the vessel to provide a annular passage for fluid flow therebetween of a gas which directly contacts the hot glowing coke for direct cooling while liquid coolant is passed through the tubes for indirectly cooling the coke.

11 Claims, 6 Drawing Figures

METHOD FOR DRY COOLING COKE AND COKE COOLER TO IMPLEMENT THE METHOD

FIELD AND BACKGROUND OF THE INVENTION

The invention relates to a method for dry cooling coke in a closed cooling chamber with as complete a recovery of the sensible heat of the glowing coke as possible, and to a coke cooler to implement the method.

A number of coke dry cooling methods are known in which the sensible coke heat is carried away in a cooling shaft by as inert a gas as possible. The inert gas is circulated and transfers the heat in a subsequent steam boiler.

A compilation of various methods operating in accordance with this principle and the equipment pertaining thereto is contained in "Gluckauf" 114 (1978) No. 14, page 611 ff.

In the course of time, significance has been gained by coke dry cooling equipment in which the hot coke is first placed in batches into a prechamber located above the actual cooling chamber. Regardless of the discharge speed of the completely cooled coke at the bottom of the prechamber, the hot coke reaches the lower cooling chamber continuously, for example, in the Gipro coke method or equipment according to West German Auslegeschrift No. 2 432 025 and West German Auslegeschrift No. 1 471 589. At irregular coke input, such as due to transport malfunctions, the cooling of the coke and particularly the steam generation associated with it can be kept constant for a certain period of time by means of the prechamber. In this method, the coke is cooled exclusively by direct heat exchange with an inert circulating gas which is blown in counterflow heat transfer relationship through the coke fill and subsequently re-transmits the heat absorbed to other media directly or indirectly. This type of cooling requires that great amounts of cooling gas be blown and circulated through the coke fill. The high cooling gas velocities at the upper outer end of the cooling chamber especially lead to the necessity in the known cooling equipment arrangements of having to separate as best as possible considerable amounts of coke dust to avoid excessive wear and fouling of the lines and equipment.

West German Auslegeschrift No. 1 471 589 discloses that the gas outlet between prechamber and cooling tank consists of channels distributed over the entire periphery of the chamber and directed obliquely upwards and, at a higher level, of a circular line encircling the prechamber, in which circular line said channels end.

After leaving the coke fill, the gas is conducted into the circular line immediately at high velocity through only a few small masonry channels. It is not practically possible to clean these channels.

In addition to these new methods and equipment for dry cooling coke, with direct heat exchange between coke and circulating gas, West German Pat. No. 601 392 discloses equipment for the dry cooling of coke in a closed chamber surrounded by coolant water lines. The coolant water lines are fed from below through distributor pipes and a tank while on top they communicate with the atmosphere through a pipe, the outlet of which is disposed over a drain chute. This method according to West German Pat. No. 601 392 has the disadvantage that the coke can be cooled in the cooling chamber only in batches, and not continuously, and that cooling usually takes three to four hours. Therefore, this method requires a multiplicity of cooling tanks per battery.

SUMMARY OF THE INVENTION

It is an object of the invention to provide an improved method and apparatus for dry coke cooling so that the dust component carried along by the circulating gas is minimized in the coke cooling operation, the cooling times are shortened, and as complete and economical a recovery of the sensible heat of the coke as possible is achieved.

According to the invention, the problem is solved by a method characterized in that the coke transfers part of its sensible heat, in part, directly in a closed cooling chamber to an inert gas circulating in counterflow and, in part, indirectly, via cooling surfaces, to a liquid coolant. Due to this combination of direct and indirect cooling it is possible to reduce the circulating coolant gas quantity considerably or accelerate the cooling action.

It has proven to be expedient to transfer about sixty-five percent of the heat to the circulating gas in direct heat exchange and to reduce the coolant gas quantity accordingly. This reduces the flow resistance in the fill, the discharge velocity from the fill and the dust content of the heated coolant gas decisively, on the one hand, while the temperature of the gas at the outlet is still high enough, on the other hand, that high-pressure steam can still be generated economically in the waste heat boiler.

Furthermore, according to the invention, it is advantageous to generate saturated high-pressure steam, preferably of a pressure exceeding 20 bar, through indirect cooling in the coke cooling shaft.

The amount of coke dust discharged from the cooling chamber is yet reduced substantially, according to the invention, in that the circulating gas leaves the cooling chamber vertically at the ringshaped upper discharge surface between prechamber and cooling tank at a very low velocity at first and then flows at a much greater velocity into an upper circular channel through adjustable calibrating holes evenly distributed over the circumference.

It has proven to be advantageous to have the circulating gas leave the coke fill, banked laterally at the angle of repose, at a maximum velocity of 5 m/sec and to have it flow through the calibrating holes at a minimum velocity of 10 m/sec. This allows the dust carried along from the fill to settle in the low velocity zone before the gas is pulled at high speed through the adjustable calibrating holes for even distribution over the ring surface. In the method according to the invention the dust content of the gases is so low that, in favorable cases, the hot, discharged gases may even be conducted directly, without dust separation, into a subsequent waste heat boiler.

To implement the method according to the invention it is proposed, for a coke cooling consisting of a prechamber to charge the coke batchwise and, below it, a cooling chamber with bottom discharge gate and with inlet and outlet openings for the circulating gas, that the outer jacket surfaces in the upper area of the cooling chamber be designed as watercooled radiation surfaces of iron or similar materials. Heretofore, due to the high coke temperatures, the upper jacket surfaces of cooling chambers had to be masonry work of refractory material and insulated on the outside at high cost to avoid heat losses (see West German Auslegschrift No. 2 432 025). Due to designing the walls as watercooled surfaces the masonry work is obviated in the entire cooling chamber area, and a simple iron structure can be used. Only the inside of the prechamber is provided with a wear-resistant, heat-insulating brick lining so as to retain the prechamber function as heat reservoir for the homogenization of the steam generated. Furthermore, the temperature of the cooled outer surfaces of the cooling chamber is kept so low that insulating material can be saved also.

Purposefully, the entire circular line carrying the hot coolant gas outside of the prechamber and the connecting line to the dedusters as well as the first deduster itself are also designed as watercooled wall surfaces in the cooling equipment according to the invention.

To enlarge the heat exchange surfaces in the cooling chamber, the invention provides furthermore that three or more vertical cooling fins be disposed additionally, emanating from the outer jacket and directed towards the center of the cooling chamber.

It is particularly advantageous when the height of the outer cooling surfaces and of the cooling fins in the upper cooling chamber area is at the most ⅔ of the height of the cooling chamber. This is to avoid that the liquid coolant is cooled by the colder coolant gas flowing from the bottom to the top.

A further reduction of the circulating gas velocity in the coke fill and particularly at the ringshaped upper outlet is achievable in that discharge holes, distributed over the entire height of the outer jacket cooling surfaces and controllably connected to the upper discharge devices via vertical shafts, are provided for the heated coolant gas. By means of these discharge holes a part of the coolant gas is deflected in radial direction from the inside to the outside, thus favoring the heat transfer from the coke fill to the cooling surfaces.

But the lateral discharge holes for the heated coolant gas and the shafts may also be joined to a separate ring channel whose outlet is connected, via a deduster, to a waste heat boiler point where the other, already cooled gases have the same temperature.

It is proposed in addition to make the diameter of the cooling chamber greater than that of the prechamber so that the prechamber diameter is no greater than about two thirds of the cooling chamber diameter. This assures that the truncated coneshaped coke pouring surface between cooling chamber and prechamber is wide enough and that the discharge velocity of the hot coolant gas remains low at this point.

It is particularly advantageous, in connection with the enlargement of the cooling chamber diameter relative to that of the prechamber, if towershaped structures to deflect the coke outwardly are provided directly under the prechamber in the middle of the cooling chamber, which structures are likewise equipped with a cooling system. An undesirable core flow in the coke fill can thus be avoided, and heat can additionally be dissipated also from the center of the chamber.

Thus, it is an object of the invention to provide a coke cooler for dry cooling hot glowing coke which includes a vertically elongated vessel at least partly surrounding a cooling chamber, a cylindrical shroud, having an internal prechamber, mounted in the upper end of the vessel and having an inlet extending therefrom for receiving a charge of the hot glowing coke and an outlet for passing the coke to the cooling chamber. The shroud cooperates with the vessel to provide an annular passage for fluid flow therebetween. The chamber and the annular passage are in fluid communication with each other. The vessel has an upper wall portion comprising a plurality of water coolable pipes and a membrane interconnecting adjacent pipes. Means are provided for passing an inert gas to the chamber in direct counterflow contact with the coke therein and then to the annular passage to indirectly cool the coke and further means are provided for passing a liquid coolant through a closed path including the pipes to indirectly cool the coke.

Further, in accordance with the invention, a method is provided of operating a coke cooler including a vessel enclosing a chamber and containing a wall with an integral heat exchange tubes for dry cooling hot glowing coke through the recovery of sensible heat from the hot glowing coke comprising the steps of passing the coke through the chamber, passing an inert gas through the chamber in a direct heat transfer in counterflow relationship with the coke and partly cool the coke and passing a liquid through the tubes to indirectly cool the coke.

It is an object of the invention to provide an apparatus and a method for dry cooling hot glowing coke which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION

A coke cooler for dry cooling hot glowing coke, in accordance with the invention, as shown in the figures, includes a vertically elongated vessel 50 at least partly surrounding a cooling chamber 2.

Figure 1:
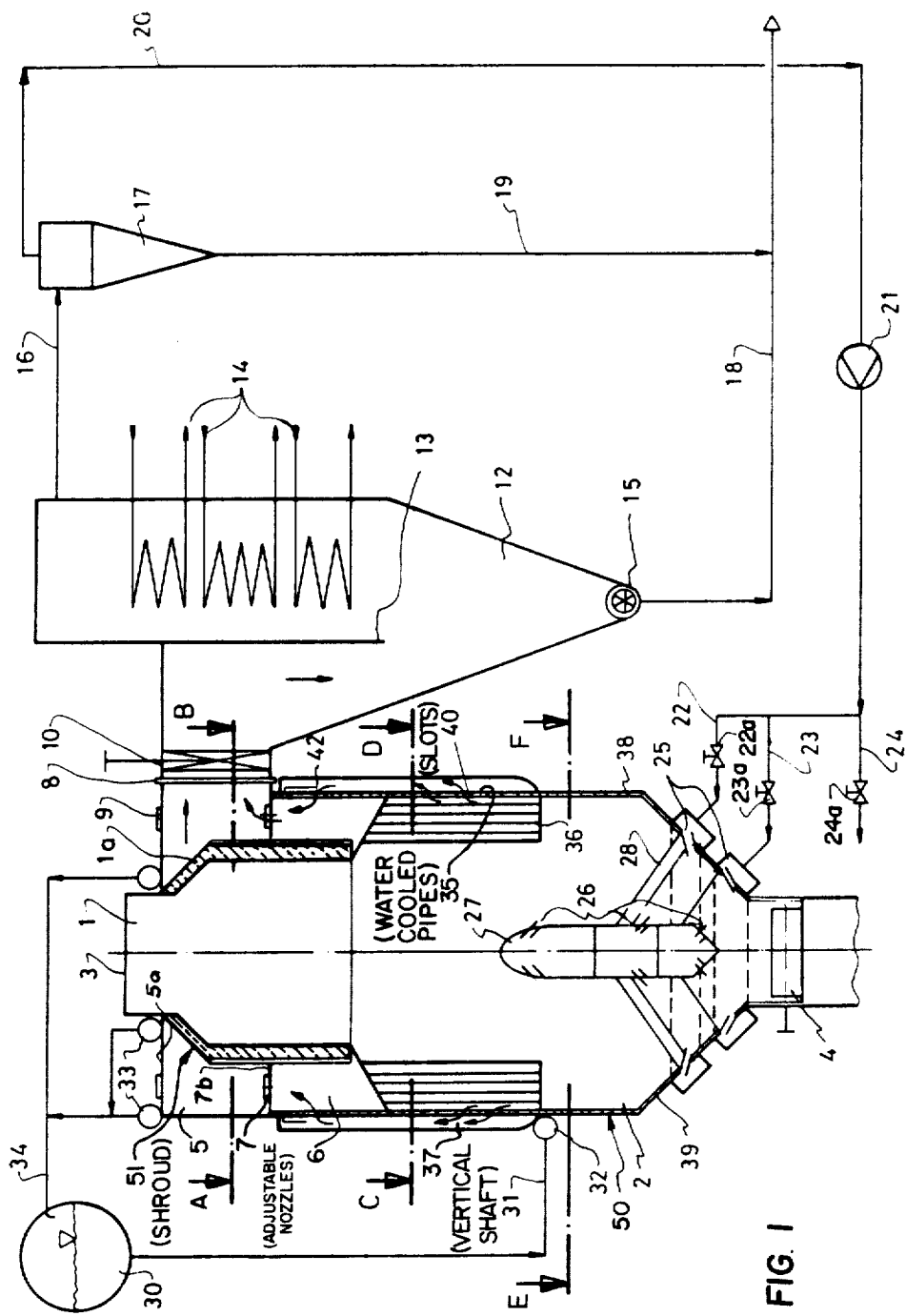
FIG. 1 is a schematic representation of a coke cooler according to the invention, including dedusting devices.
Figure 2:
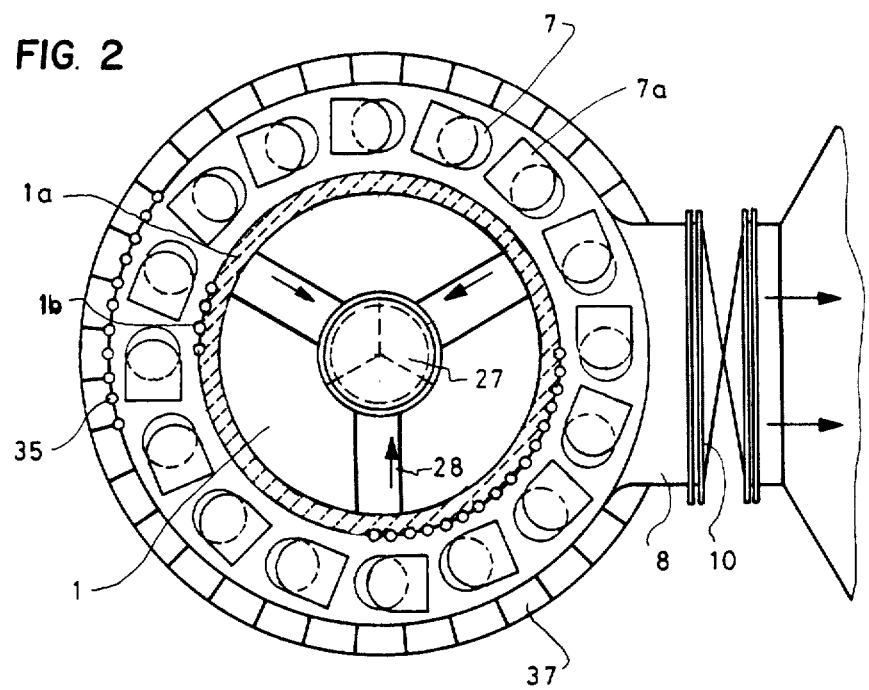
FIG. 2 is a section of the prechamber along line A-B in FIG. 1.
Figure 3:
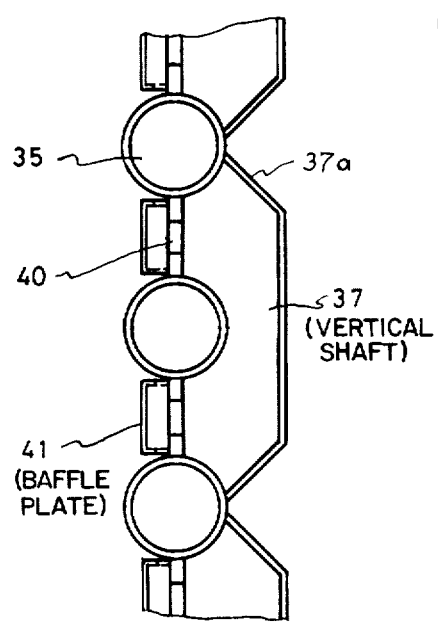
FIG. 3 is a horizontal section of an enlarged portion of the cooling chamber cooling jacket according to the invention.
Figure 5:
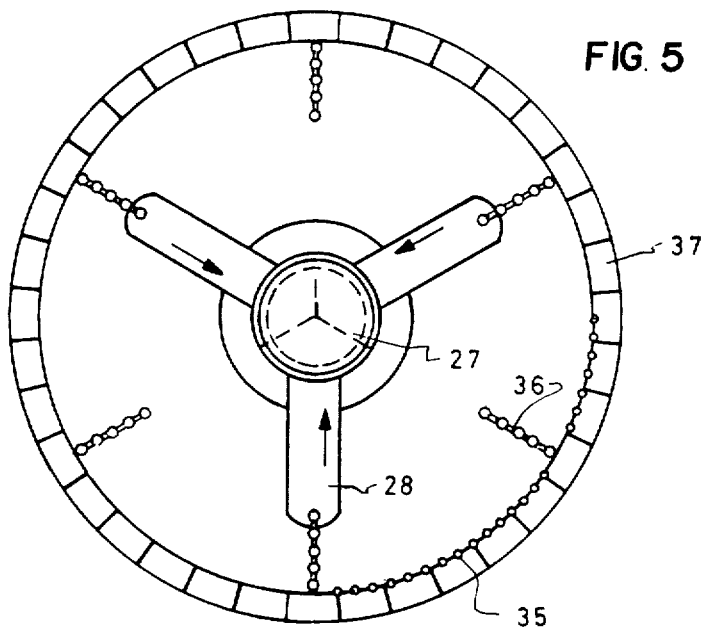
FIG. 5 is a section of the cooling chamber along line C-D in FIG. 1.
Figure 6:
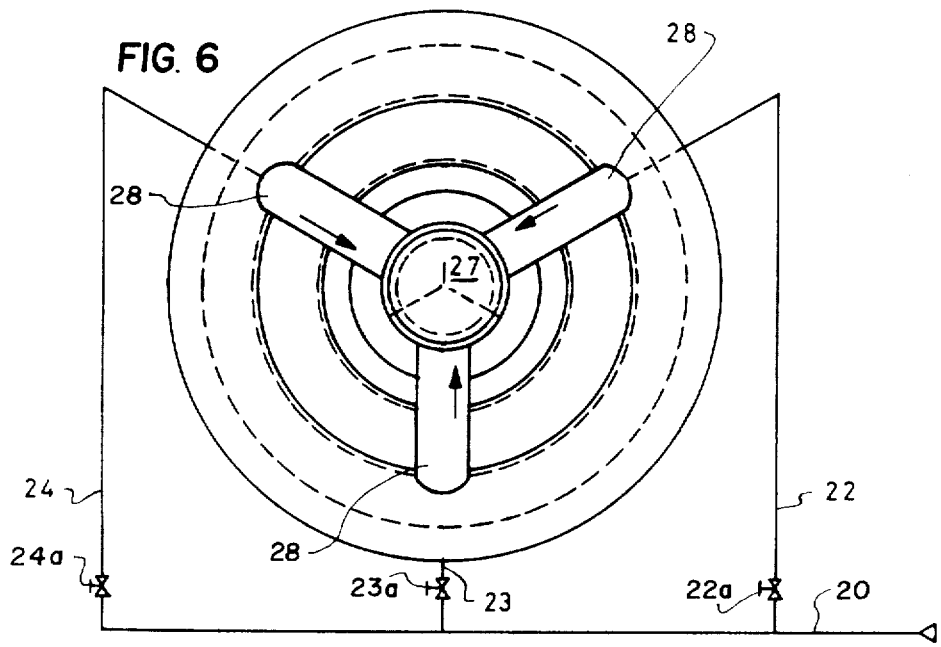
FIG. 6 is a section of the cooling chamber along line E-F in FIG. 1.

The coke cooler includes a shroud 51 having a prechamber 1, lined with refractory insulating material 1a and having an opening 3 for receiving a batch fill of hot coke. The vertical cooling chamber 2 disposed below the prechamber 1. The upper portion of the cooling chamber 2 includes an outside wall, having a watercooled tube construction in which adjacent water cooled pipes 35 are integrally formed within the wall, and adjacent pipes 35 are interconnected by a membrane. To enlarge the internally cooled radiation surfaces, additional cooling fins 36, formed of watercooled pipes and membranes (see FIG. 5), extending from the outer cooling pipes 35, are oriented towards the center of the cooling chamber 2. The cooling fins 36 radially extend for a distance of approximately at one-third of the cooling chamber radius toward the center of the chamber. At the outer surface of the watercooled tube construction, vertical shafts 37 are formed by plate members 37a having longitudinal end portions which are connected to some of the watercooled pipes 35 (see FIG. 3). A plurality of slots 40 extend through the membrane between adjacent pipes 35 to establish fluid communication between the vertical shafts 37 and the vertical cooling chamber 2. Baffle plates 41 overlie each of the slots 40 on the cooling chamber side of the watercooled tube construction portion of the wall.

The lower third of the cooling chamber 2 has a bottom 39 which tapers downwardly in a funnel shape. The outside walls 38 as well as the coke discharge 4 are made of iron. The coolant gas supply distribution system 22 to 28 includes a distribution line 20 interconnected to a plurality of individual distribution lines 22, 23, 24, each including a respective valve 22a, 23a, 24a, which are interconnected to outlet slots 25 disposed at spaced locations around the periphery of the tapered bottom 39. Tower-shaped structures 27 are centrally located within the vertical cooling chamber and communicate with the cooling gas supplied through the slots 25 via lines 28.

To distribute the circulating coolant gases evenly already when they enter the coolant chamber 2, outlet slots 25 are controllably disposed in ring-shape in the funnel-shaped cooling tank bottom 39 at different levels. In addition, tower-shaped structures 27 are located in the middle of the tank and have likewise height-staggered, controllable, outwardly oriented slots 26 for the coolant gas which is externally supplied through the line 28. These tower-shaped structures 27 may extend as far as directly to the lower end of the prechamber 1. The structures 27 are also watercooled, and therefore, iron materials can be used also in those zones where the coke is still red-hot.

A part of the hot coolant gas flows from the coke fill via a wide annular gap or lower annular chamber 6, formed between an upper wall portion cooling chamber 2 and prechamber 1, along the outside wall 1a of the prechamber 1, vertically upward, and is evenly distributed over the circumference of the prechamber 1 through adjustable calibrating nozzles 7, in an annular top plate 7b at the upper end of annular gap 6, which communicate with an annular channel or upper annular chamber 5 which is connected to a subsequent deduster 12 via an outlet nipple 8 and the shutoff valve 10. The inside walls of the annular gap 6 and of the annular channel 5 are designed as water-tube coolable walls. Additional slide valves 7a located on the calibrating nozzles 7 are readily movable of rods through openings 9 provided in the roof 5a of the annular channel 5 to improve the distribution.

Figure 4:
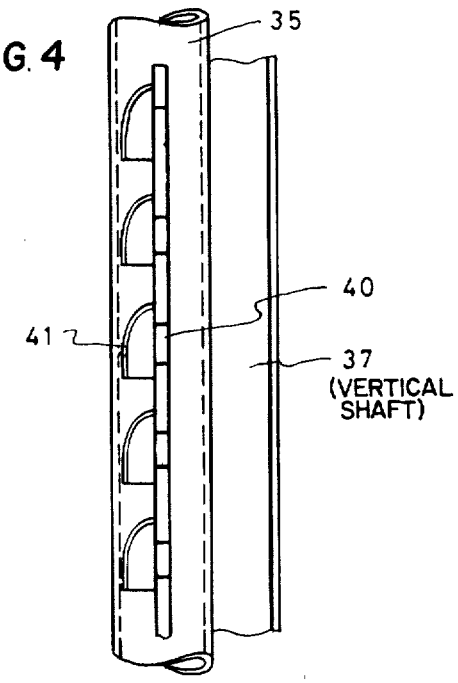
FIG. 4 is a longitudinal section of an enlarged portion of the cooling chamber cooling jacket.

Another part of the coolant gas is carried radially out of the chamber 2 already between the watercooled tube construction containing cooling pipes 35 outwardly through slots 40 and through the vertical shafts 37 and the calibrated holes 42 into the upper annular gap 6. To prevent coke dust from penetrating the slots 40, baffle plates 41 (see FIG. 4) extending towards the cooling chamber are provided.

The dust separator 12 is divided by a wall 13 in known manner into a part in which the hot coolant gas flows downwardly and a part in which the coolant gas flows upwardly successively through several heat exchangers 14 before being returned for repeated dedusting into a cyclone 17 via a line 16 and thence to the cooling chamber via line 20 and a blower 21. The coke dust separated is discharged from the deduster 12 via a gate 15 and a line 18 connected jointly to receive the fine dust from the cyclone 17 through line 19.

The watercooled cooling surfaces of the cooling chamber and of the upper, outside ring line form a closed circulation loop via the collecting lines 32 and 33 and the circulation lines 31 and 34 with the steam boiler 30.

Thus, in accordance with the invention, a method for dry cooling coke in a closed cooling chamber with as complete a recovery of the sensible heat of the glowing coke as possible, is characterized in that the coke transfers part of its sensible heat in the cooling chamber directly to an inert gas circulating in counterflow and part indirectly via cooling surfaces to a liquid coolant. It is preferred that approximately 65% of the heat be transferred to the circulating gas in direct heat exchange and that the quantity of coolant gas is reduced accordingly. In accordance with an embodiment of the method, high-pressure steam, preferably of a minimum pressure of 20 bar, is generated by the indirect cooling in the coke cooling shaft. The circulating gas discharges from the coolant chamber vertically at the annular upper outlet surface between prechamber and cooling tank at a low velocity at first and subsequently flows at a much higher velocity into an upper annular channel through adjustable calibrating holes evenly distributed over the circumference. In addition, the circulating gas discharges from the coke fill is banked laterally to the outside at the angle of repose, at a maximum velocity of 5 m/sec and flows through the calibrating holes at a minimum velocity of 10 m/sec. As noted hereinbefore, the coke cooler to implement the method includes a prechamber 1 for batchwise charging and of a cooling chamber 2 disposed below the former, the latter having a lower discharge gate 4 as well as inlet and outlet openings for the circulating gas. The outer jacket surfaces in the upper area of the cooling chamber are designed as watercooled radiation surfaces 35, 36 of iron or similar materials.

The entire annular passage 5 carrying the hot coolant gas outside of the prechamber 1 and the connecting line 8 to the deduster 12 as well as the deduster 12 itself may be provided with watercooled wall surfaces. Three or more vertical cooling fins 36 are preferably provided additionally, each emanating from the outer jacket 35 and oriented to the center of the cooling chamber. The height of the outer cooling surface 35 and of the cooling fins 36 in the upper area of the cooling chamber 2 is at the most two-thirds of the height of the cooling chamber 2. Discharge opening 40 are preferably distributed over the entire height, for the heated coolant gas in the outer jacket surfaces 35 of the cooling chamber 2. The discharge openings 40 are controllably connected to the upper discharge devices via the vertical shafts 37.

The lateral discharge openings 42 for the heated coolant gas and the shafts 37 are connected to a separate annular passage whose outlet is connected via a deduster to a point of the waste heat boiler 14 where the other gases, partly cooled already, have the same temperature.

In accordance with a preferred embodiment, the diameter of the prechamber 1 is no greater than about ⅔ of the diameter of the cooling chamber 2, both being of circular cross section. The tower-shaped structures for the outward deflection of the coke are present directly below the prechamber 1 in the middle of the cooling chamber 2 and are likewise equipped with a cooling system.

The inside walls of the annular gap 6 and of the passage 5 are also preferably designed as cooling walls.

While a specific embodiment of the invention has been shown and described in detail to illustrate the application of the principles of the invention, it will be understood that the invention may be embodied otherwise without departing from such principles.

What is claimed is:

1. A coke cooler for dry cooling hot glowing coke through the recovery of the sensible heat of the hot glowing coke comprising a vertically elongated vessel at least partly surrounding a cooling chamber, a cylindrical shroud, having an internal prechamber, mounted in the upper end of said vessel and having an inlet extending therefrom for receiving a charge of the hot glowing coke and an outlet for passing the coke through the upper end of said vessel to said cooling chamber, said shroud cooperating with the vessel to provide an annular passage for fluid flow therebetween, said chamber and said annular passage being in fluid communication with each other, said vessel having an upper wall portion comprising a first plurality of pipes and membranes integrally interconnecting adjacent pipes, means for passing an inert gas to said chamber in direct counterflow contact with the coke therein and then to said annular passage to directly cool the coke, means for passing a liquid through a closed path extended through said pipes to indirectly cool the coke, discharge means at the lower end of said vessel for passing cooled coke from said chamber, wall means mounted to the outer surface of said vessel at said upper wall portion to define vertical shafts between said wall means and said upper wall portion, said membranes having a plurality of slots for fluid communication between said cooling chamber and said vertical shafts, and said vessel including a plurality of calibrating holes passing through the vessel wall to establish fluid communication between said vertical shafts and said annular passage whereby at least a part of the inert gas is passed from said inert gas passing means into said chamber, through said slots, through said shafts, through said calibrating holes and into said annular passage.

2. The coke cooler as set forth in claim 1, further comprising means for vertically dividing said annular passage into an upper annular chamber and a lower annular chamber, said calibrating holes passing through the vessel wall at and communicating with said lower annular chamber, calibrating nozzle means extending through said dividing means for establishing fluid communication between said lower annular chamber and said upper annular chamber, said calibrating nozzle means cooperating with said lower and upper annular chambers to establish a higher velocity flow of said inert gas in said upper annular chamber than in said lower annular chamber.

3. The coke cooler as set forth in claim 2, wherein said dividing means comprises an annular plate, and said calibrating nozzle means comprises a plurality of nozzles circumferentially distributed in said annular plate.

4. The coke cooler as set forth in claim 2, wherein the maximum velocity of said inert gas in said lower annular chamber is 5 m/sec and wherein said inert gas is passed through said calibrating nozzle means to said upper annular chamber at a minimum velocity of 10 m/sec.

5. The coke cooler as set forth in claim 1 or 4, further comprising at least three cooling fins connected to said pipes and extended into the cooling chamber from said upper wall portion at peripherally spaced locations, said pipes and each of said fins being vertically extended along said upper wall portion for a distance of not more than two-thirds the height of the cooling chamber.

6. A method of dry cooling hot glowing coke in a coke oven cooler of the type set forth in claim 1 comprising the steps of passing the hot glowing coke to be cooled through said shroud into the cooling chamber, passing an inert gas through the chamber in direct heat transfer counterflow relationship with the coke to directly remove approximately 65% of the sensible heat of the hot glowing coke, and passing a liquid through the tubes to indirectly cool the coke.

7. The coke cooler as set forth in claim 1, further comprising at least three cooling fins connected to said pipes and extending into the cooling chamber from said upper wall portion at peripherally spaced locations.

8. The coke cooler as set forth in claim 7, wherein each of said fins vertically extends along said upper wall portion for a distance of not more than two-thirds the height of the cooling chamber.

9. The coke cooler as set forth in claim 1, further comprising means for dedusting the inert cooling gas operatively connected to said annular passage, and wherein said means for passing a liquid through a closed passage includes a waste heat boiler connected to said first plurality of pipes.

10. The coke cooler as set forth in claim 1, wherein said prechamber and said cooling chamber are cylindrical and said prechamber has a diameter no more than two-thirds of the diameter of said cooling chamber.

11. The coke cooler as set forth in claim 1, wherein said inert gas passing means includes a tower-shaped gas distributor mounted centrally within said cooling chamber directly below said prechamber and wherein said distributor includes means for deflecting coke outwardly thereof.

* * * * *